(12) United States Patent
Tanahashi et al.

(10) Patent No.: US 10,196,959 B2
(45) Date of Patent: Feb. 5, 2019

(54) VEHICLE ENGINE EXHAUST SYSTEM

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 189 days.

(21) Appl. No.: 14/979,671

(22) Filed: Dec. 28, 2015

(65) Prior Publication Data
US 2016/0186639 A1    Jun. 30, 2016

(30) Foreign Application Priority Data

Dec. 26, 2014 (JP) ................................. 2014-265749

(51) Int. Cl.
*B60C 19/08* (2006.01)
*H05F 3/00* (2006.01)
(Continued)

(52) U.S. Cl.
CPC .............. *F01N 13/08* (2013.01); *B60K 13/04* (2013.01); *B60R 16/06* (2013.01); *F01N 13/16* (2013.01);
(Continued)

(58) Field of Classification Search
CPC ............. F01N 13/08; F01N 13/16; H05F 3/00
(Continued)

(56) References Cited

U.S. PATENT DOCUMENTS

| 3,597,668 A | 8/1971 | Yoshimine |
| 3,922,214 A | 11/1975 | Van Cakenberghe |
| (Continued) | | |

FOREIGN PATENT DOCUMENTS

| CN | 101500686 A | 8/2009 |
| DE | 102010003789 A1 | 10/2011 |
| (Continued) | | |

OTHER PUBLICATIONS

US Patent and Trademark Office, Final Office Action issued in U.S. Appl. No. 15/018,085, dated Jun. 7, 2017, 27 pages.
(Continued)

*Primary Examiner* — Lucy Thomas
(74) *Attorney, Agent, or Firm* — Hunton Andrews Kurth LLP

(57) ABSTRACT

A vehicle engine exhaust system includes an exhaust component and a non-conductive support member. The exhaust component is supported by a vehicle body via the non-conductive support member. The vehicle body and the exhaust component are positively charged. The vehicle engine exhaust system further includes a self discharge type static electricity eliminator that reduces, in a state where the self discharge type static electricity eliminator is installed on a non-conductive wall surface, an amount of electrification charge on the non-conductive wall surface within a limited area around a location where the self discharge type static electricity eliminator is installed. The self discharge type static electricity eliminator is installed on the non-conductive support member such that static electricity elimination is performed for the exhaust component.

10 Claims, 7 Drawing Sheets

(51) Int. Cl.
  *F01N 13/08* (2010.01)
  *F01N 13/16* (2010.01)
  *F01N 13/18* (2010.01)
  *B60R 16/06* (2006.01)
  *B60K 13/04* (2006.01)

(52) U.S. Cl.
  CPC ........... *F01N 13/1822* (2013.01); *H05F 3/00* (2013.01); *F01N 2530/20* (2013.01); *F01N 2530/22* (2013.01)

(58) Field of Classification Search
  USPC ........................................................ 361/217
  See application file for complete search history.

(56) References Cited

U.S. PATENT DOCUMENTS

| | | | |
|---|---|---|---|
| 4,210,016 | A | 7/1980 | Peter et al. |
| 4,795,935 | A | 1/1989 | Fujii et al. |
| 5,095,400 | A | 3/1992 | Saito |
| 5,212,451 | A | 5/1993 | Werner, Jr. |
| 5,303,584 | A | 4/1994 | Ogasawara et al. |
| 5,382,359 | A | 1/1995 | Brandt |
| 5,825,605 | A * | 10/1998 | Sutherland ............. B60R 16/06 361/216 |
| 6,235,385 | B1 | 5/2001 | Lee |
| 7,248,454 | B2 | 7/2007 | Takayanagi |
| 7,575,216 | B2 * | 8/2009 | Zimmermann ........ B60K 13/04 248/60 |
| 7,684,169 | B1 | 3/2010 | Larkin |
| 7,832,528 | B1 | 11/2010 | Liang |
| 7,971,689 | B2 | 7/2011 | Moore |
| 8,432,658 | B1 * | 4/2013 | Heise ..................... F01N 13/16 361/216 |
| 8,503,154 | B2 | 8/2013 | Nakai |
| 9,044,916 | B2 | 6/2015 | Koike et al. |
| 2002/0179311 | A1 | 12/2002 | Alper |
| 2003/0183465 | A1 | 10/2003 | Ikeda |
| 2005/0018375 | A1 | 1/2005 | Takayanagi |
| 2006/0213422 | A1 * | 9/2006 | Zimmermann ........ B60K 13/04 116/278 |
| 2008/0036241 | A1 | 2/2008 | Aisenbrey |
| 2009/0242334 | A1 | 10/2009 | Moore |
| 2010/0154643 | A1 | 6/2010 | Goto et al. |
| 2012/0039012 | A1 | 2/2012 | Nakai |
| 2013/0291837 | A1 | 11/2013 | Johnson et al. |
| 2016/0059838 | A1 | 3/2016 | Yamada et al. |
| 2016/0108868 | A1 | 4/2016 | Tanahashi et al. |
| 2016/0177811 | A1 | 6/2016 | Tanahashi et al. |
| 2016/0186703 | A1 | 6/2016 | Tanahashi et al. |
| 2016/0192463 | A1 | 6/2016 | Tanahashi et al. |
| 2016/0200270 | A1 | 7/2016 | Tanahashi et al. |
| 2016/0208748 | A1 | 7/2016 | Tanahashi et al. |
| 2016/0214453 | A1 | 7/2016 | Tanahashi et al. |
| 2016/0223024 | A1 | 8/2016 | Tanahashi et al. |
| 2016/0230824 | A1 | 8/2016 | Tanahashi et al. |

FOREIGN PATENT DOCUMENTS

| | | |
|---|---|---|
| EP | 1116621 A1 | 7/2001 |
| EP | 3009653 A1 | 4/2016 |
| GB | 824448 A | 12/1959 |
| JP | S50-026778 | 3/1975 |
| JP | S54074779 A | 6/1979 |
| JP | S61-194999 | 8/1986 |
| JP | S61194999 U | 12/1986 |
| JP | S63243720 A | 10/1988 |
| JP | H01102722 U | 7/1989 |
| JP | H01169323 A | 7/1989 |
| JP | H101102722 U | 7/1989 |
| JP | H101169323 A | 7/1989 |
| JP | H05-238438 A | 9/1993 |
| JP | H063396 A | 1/1994 |
| JP | 2001-355524 A | 12/2001 |
| JP | 2002-104106 A | 4/2002 |
| JP | 2006234093 A | 9/2006 |
| JP | 2008181694 A | 8/2008 |
| JP | 2010-192177 A | 9/2010 |
| JP | 3194675 U | 12/2014 |
| JP | 2016078640 A | 5/2016 |
| JP | 2016121671 A | 7/2016 |
| WO | 8701301 A1 | 3/1987 |

OTHER PUBLICATIONS

Extended European Search Report issued in European Application 15202572.2-1606 dated May 4, 2016.
Office Action issued in U.S. Appl. No. 15/018,085 dated Dec. 14, 2016.
Specification of U.S. Appl. No. 15/032,793, filed Apr. 28, 2016 (later published as US 2016-0280162 on Sep. 29, 2016).
US Patent and Trademark Office, Notice of Allowance in U.S. Appl. No. 15/018,085, dated Oct. 20, 2017, 7 pages.
U.S. Patent and Trademark Office, Corrected Notice of Allowability dated Dec. 14, 2017 in U.S. Appl. No. 15/018,085, 4 pages.
U.S. Patent and Trademark Office, Corrected Notice of Allowability dated Jan. 9, 2018 in U.S. Appl. No. 15/018,085, 4 pages.
U.S. Patent and Trademark Office, Corrected Notice of Allowability dated Feb. 2, 2018 in U.S. Appl. No. 15/018,085, 4 pages.
Non-Final Office Action dated May 10, 2018; issued by the U.S. Patent and Trademark Office in U.S. Appl. No. 14/979,664, 43 pages.

* cited by examiner

VEHICLE ENGINE EXHAUST SYSTEM

INCORPORATION BY REFERENCE

The disclosure of Japanese Patent Application No. 2014-265749 filed on Dec. 26, 2014 including the specification, drawings and abstract is incorporated herein by reference in its entirety.

BACKGROUND OF THE INVENTION

1. Field of the Invention

The invention relates to a vehicle engine exhaust system.

2. Description of Related Art

A vehicle is publicly known, in which a discharge device such as a discharge antenna is mounted on an engine or an engine-related member of the vehicle, and high-voltage electricity, static electricity and so on generated or charged in the engine area is discharged and emitted outside, thereby improving fuel economy (for example, see Japanese Patent Application Publication No. 5-238438 (JP 5-238438 A)).

As described in JP 5-238438 A, it has been conventionally known that static electricity is charged in a vehicle, and that static electricity charged in a vehicle have some kind of influence on driving of the vehicle. However, specifically why and how the static electricity charged in a vehicle affects driving of the vehicle is not known for sure. Therefore, there is a room for consideration about how to appropriately deal with static electricity charged in a vehicle.

SUMMARY OF THE INVENTION

The invention provides a vehicle engine exhaust system that performs static electricity elimination (the static electricity reduction) for an exhaust component, thereby increasing engine power and also improving driving stability of the vehicle.

An aspect of the invention relates to a vehicle engine exhaust system including an exhaust component and a non-conductive support member. The exhaust component is supported by a vehicle body via the non-conductive support member. The vehicle body and the exhaust component are positively charged. The vehicle engine exhaust system further includes a self discharge type static electricity eliminator that reduces, in a state where the self discharge type static electricity eliminator is installed on a non-conductive wall surface, an amount of electrification charge on the non-conductive wall surface within a limited area around a location where the self discharge type static electricity eliminator is installed. The self discharge type static electricity eliminator is installed on the non-conductive support member such that static electricity elimination is performed for the exhaust component.

By installing the self discharge type static electricity eliminator on the non-conductive support member, the static electricity elimination is performed for the exhaust component. As a result, the engine power is improved, and driving stability of a vehicle is thus improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
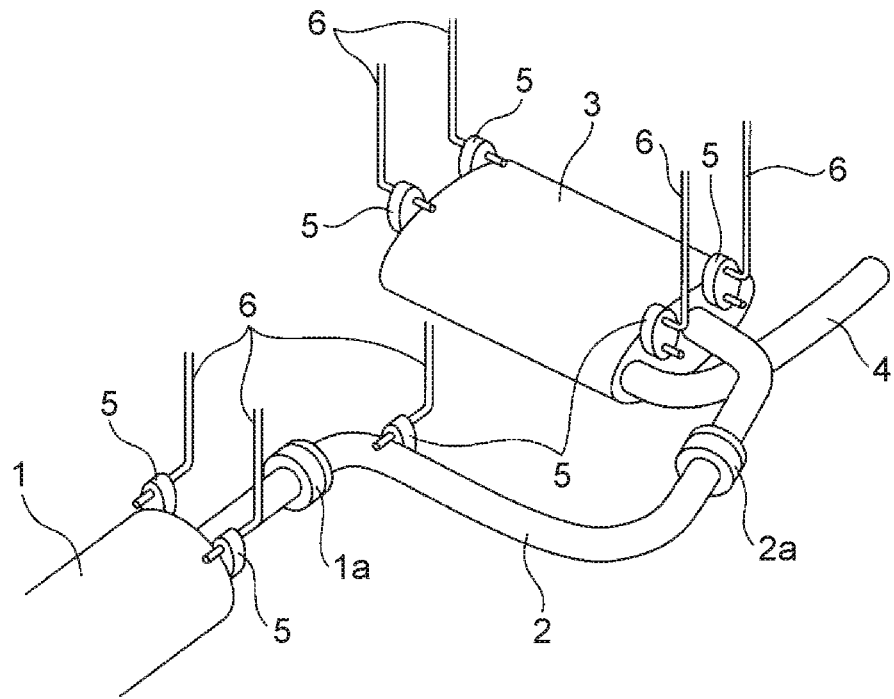
FIG. 1 is a perspective view of an engine exhaust system.

FIG. 1 shows a perspective view of an engine exhaust system arranged under a vehicle floor. FIG. 1 shows a catalytic converter 1, an exhaust pipe 2 connected to the catalytic converter 1, a silencer 3 connected to the exhaust pipe 2 via a connection part 2a, and a tail pipe 4. In the example shown in FIG. 1, exhaust gas discharged from an engine (internal combustion engine) is sent into the catalytic converter 1, and then the exhaust gas passes through the exhaust pipe 2 and is sent into the silencer 3. Thereafter, the exhaust gas is discharged into the atmosphere from the tail pipe 4. The catalytic converter 1, the exhaust pipe 2, the silencer 3, and the tail pipe 4 are herein referred to as exhaust components. Although not shown in FIG. 1, other components such as an exhaust treatment device and a heat recovery device, which are arranged under the vehicle floor, are also included in the exhaust components.

The exhaust components are supported by a vehicle body via non-conductive support members. A vehicle body including a chassis is herein referred to as the vehicle body. The support members are formed from a non-conductive rubber material. In the example shown in FIG. 1, non-conductive rubber pieces 5 are used as the support members, and upper parts of the rubber piece 5 are supported by the vehicle body via supporting rods 6. Meanwhile, the catalytic converter 1, the exhaust pipe 2, and the silencer 3 as the exhaust components are supported by lower parts of the rubber pieces 5. This means that the catalytic converter 1, the exhaust pipe 2, and the silencer 3 are supported by the vehicle body via the rubber pieces 5.

Figure 2:
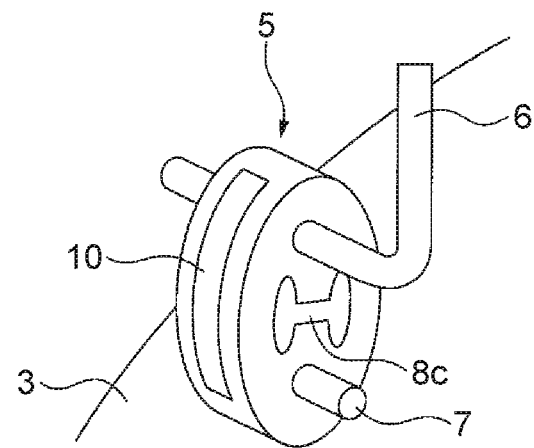
FIG. 2 is an enlarged perspective view of a periphery of a support member (rubber piece) shown in FIG. 1.
Figure 3:
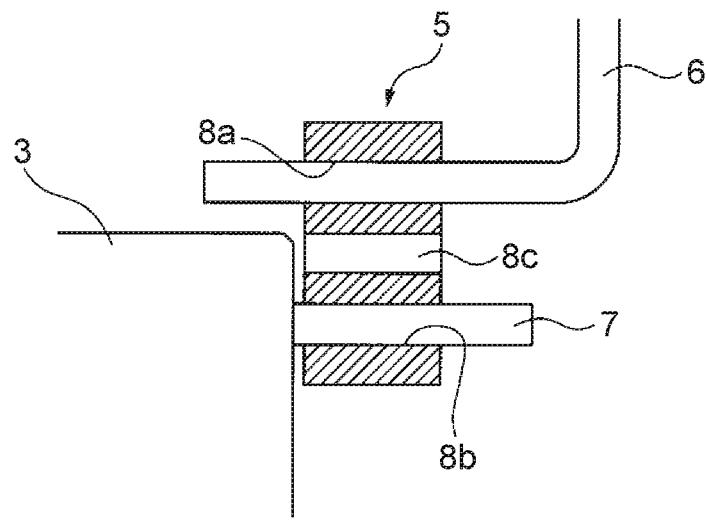
FIG. 3 is a sectional view of the support member (rubber piece) shown in FIG. 1.
Figure 4A:
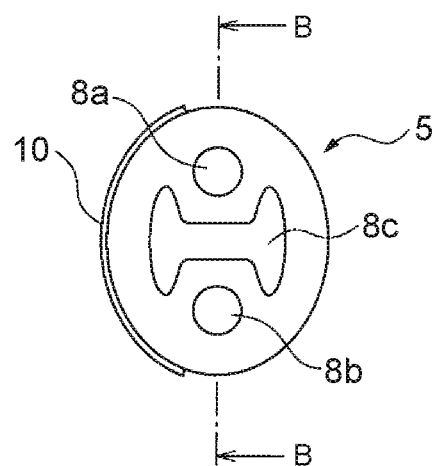
FIG. 4A and FIG. 4B are a front view and a side sectional view of the support member (rubber piece), respectively.
Figure 4B:
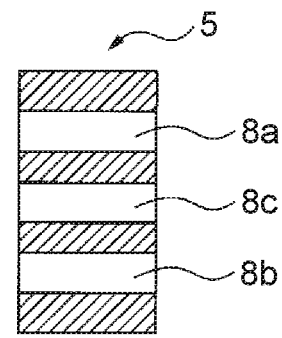

FIG. 2 shows an enlarged perspective view of the rubber piece 5 mounted on the silencer 3, FIG. 3 shows a longitudinal sectional view of FIG. 2, FIG. 4A shows a front view of the rubber piece 5, and FIG. 4B shows a side sectional view of the rubber piece 5. As shown in FIG. 2 to FIG. 4B, the rubber piece 5 has a cylindrical shape with an elliptical section, and the rubber piece 5 includes a pair of through holes 8a, 8b that extend in parallel to each other at an interval. The supporting rod 6, which is supported by the vehicle body, is inserted into one through hole 8a, and a supporting rod 7 fixed to an outer wall of the exhaust component, which is the silencer 3, is inserted into the other through hole 8b. In the rubber piece 5, a slit 8c is formed between the through holes 8a, 8b.

As shown in FIG. 1, the silencer 3 is supported by the vehicle body via four rubber pieces 5, and the catalytic converter 1 is also supported by the vehicle body via four rubber pieces 5 (not shown in FIG. 1). Meanwhile, the exhaust pipe 2 is supported by the vehicle body via the rubber piece 5.

When a vehicle runs, each part of tires comes into contact with and is separated from a road surface repeatedly, and static electricity is thus generated. Static electricity is also generated as components of the engine as well as components of a braking device move relative to each other. Further, static electricity is generated due to flow of air along an outer peripheral surface of the vehicle with generating friction between the flowing air and the outer peripheral surface of the vehicle when the vehicle is running. Because of the static electricity generated as above, the vehicle's body, engine, and so on are charged. In such a case, it is confirmed the exhaust components, that means the catalytic converter 1, the exhaust pipe 2, and the silencer 3 are positively charged, and at the same time, rubber pieces 5 are positively charged as well. Moreover, it is confirmed that there is a case where voltage values of wall surfaces of the converter 1, the exhaust pipe 2, the silencer 3, and the rubber pieces 5 are as high as 1000 (v) or higher.

Figure 6A:
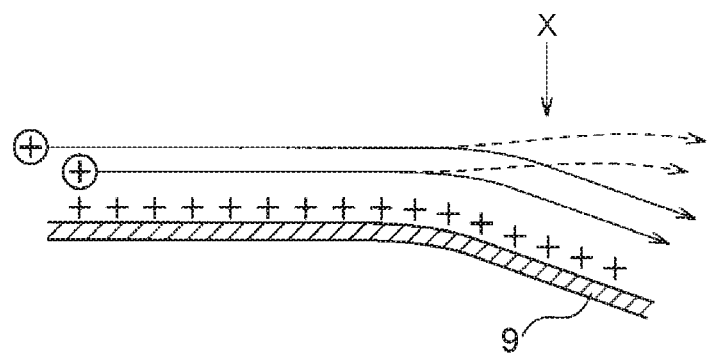
FIG. 6A and FIG. 6B are views for illustrating a change of an air flow.

It is confirmed that, when a voltage value becomes high on a surface of a thin wall, a flow of air along the surface of the thin wall changes. Thus, to begin with, explanation is given with regard to how an air flow along the surface of the thin wall changes in accordance with a voltage value on the surface of the thin wall, based on phenomena confirmed in an experiment. FIG. 6A shows a case where air flows along a surface of a thin wall 9 that is positively charged. In this case, since air tends to be positively charged, FIG. 6A shows a case where positively-charged air flows along the surface of the thin wall 9 that is positively charged. In FIG. 6A, solid-line arrows show a case where a voltage value on the surface of the thin wall 9 is low, and, in this case, air flows along the surface of the thin wall 9. On the contrary, broken-line arrows show a case where a voltage value on the surface of the thin wall 9 is high, and, in this case, air flows so as to be separated from the surface of the thin wall 9 at a point where the surface of the thin wall 9 starts to curve downwardly, that is a point where the air flow is easily separated from the surface of the thin wall 9.

Figure 6B:
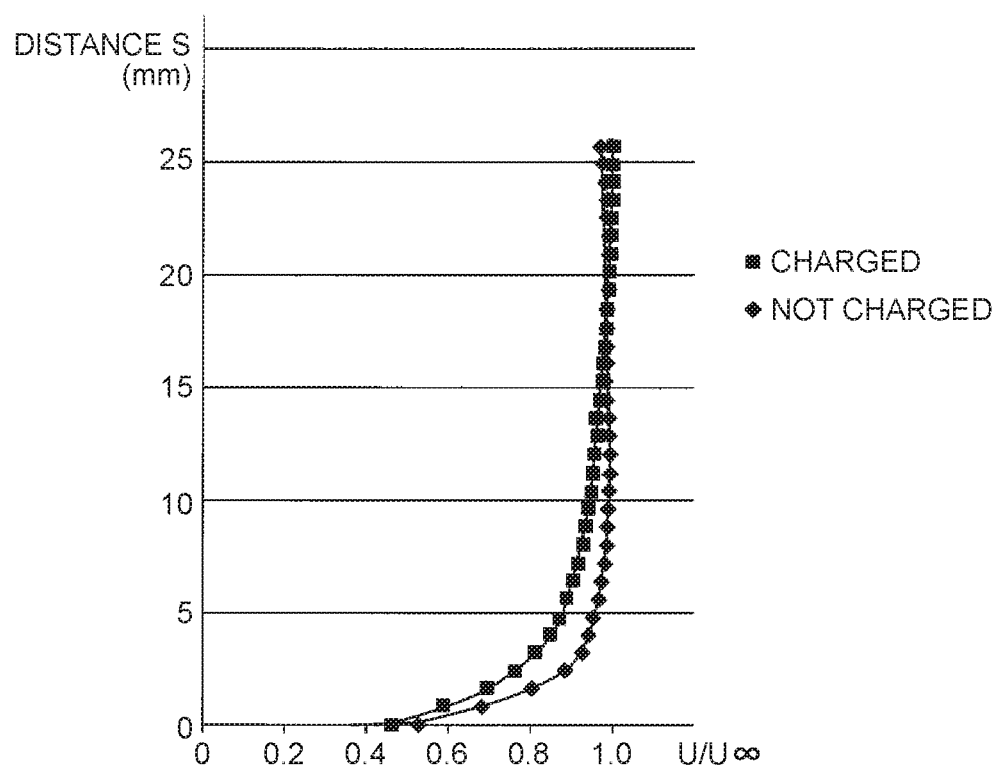

FIG. 6B shows measured values of a velocity ratio $U/U_\infty$, at point X (FIG. 6A), between a flow velocity $U_\infty$ of a main flow of air that flows along the surface of the thin wall 9 in FIG. 6A, and a flow velocity U at a point away from the surface of the thin wall 9 by a distance S. Each point shown by a black rhombus in FIG. 6B shows a case where the surface of the thin wall 9 is not positively charged, and each point shown by a black quadrangle in FIG. 6B shows a case where the surface of the thin wall 9 is positively charged. It is understood from FIG. 6B that, in the case where the surface of the thin wall 9 is positively charged, a velocity boundary layer is separated more from the surface of the thin wall 9 compared to the case where the surface the thin wall 9 is not positively charged. Therefore, in the case where the surface of the thin wall 9 is positively charged, air flows so as to be separated from the surface of the thin wall 9 as shown by the broken-line arrows in FIG. 6A.

As stated above, air tends to be positively charged. Therefore, positive air ions (indicated with + in a circle) are present in a part of air. Accordingly, when the surface of the thin wall 9 is positively charged, repulsive force acts between the positive air ions and the surface of the thin wall 9. Thus, as shown by the broken-line arrows in FIG. 6A, air flows so as to be separated from the surface of the thin wall 9 at the point where the surface of the thin wall 9 starts to curve downwardly, that is the point where the air flow is easily separated from the surface of the thin wall 9. As described above, it is confirmed from the experiment that an air flow along the surface of the thin wall 9 is separated from the surface of the thin wall 9 because of positive charge on the surface of the thin wall 9. In this case, it is known that the higher the voltage value becomes on the surface of the thin wall 9, the more the air flow along the surface of the thin wall 9 is separated from the surface of the thin wall 9.

It is confirmed that, in a case where the surface of the thin wall 9 has a shape that easily causing separation of the air flow, the air flow is not separated when the surface of the thin wall 9 is not positively charged, whereas an air flow could be separated when the surface of the thin wall 9 is positively charged. It is also confirmed that, when the surface of the thin wall 9 is positively charged, a degree of separation of an air flow is greater than that in the case where the surface of the thin wall 9 is not positively charged. In this way, it is confirmed that, when the surface of the thin wall 9 is positively charged, an air flow is separated from the surface of the thin wall 9 or separation of air happens due to electrical repulsive force.

As described above, it is confirmed that there is a case where voltage values on the wall surfaces of the catalytic converter 1, the exhaust pipe 2 and the silencer 3 become as high as 1000 (v) or higher. In this case, judging from the experiment results shown in FIG. 6A and FIG. 6B, it is presumed that an exhaust gas flowing inside the catalytic converter 1, the exhaust pipe 2, and the silencer 3 is changed by the high voltage, which affects an exhaust function. Further, judging from the experiment results shown in FIG. 6A and FIG. 6B, it is also presumed that a flow of air around the catalytic converter 1, the exhaust pipe 2, and the silencer 3 is changed due to the high voltage, which affects driving of a vehicle.

Thus, an experiment was carried out regarding an exhaust function. As a result, it was found that exhaust pressure was increased when the voltage value on the wall surfaces of the catalytic converter 1, the exhaust pipe 2, and the silencer 3 were high, which leads to decrease in engine power. An experiment was also carried out about an influence on driving of a vehicle. As a result, it was found that, when the voltage values of the wall surfaces of the catalytic converter 1, the exhaust pipe 2, and the silencer 3 were high, driving of a vehicle became unstable.

Figure 5A:
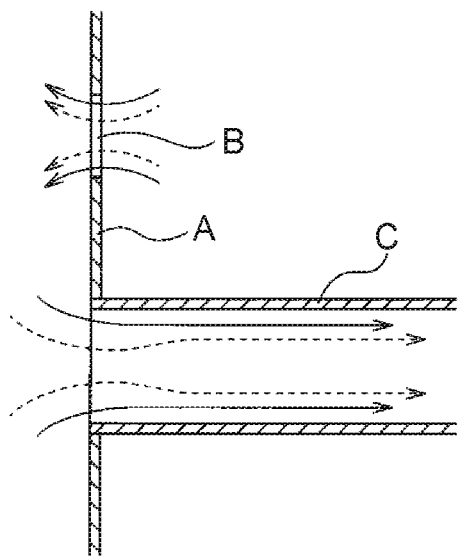
FIG. 5A and FIG. 5B are views for illustrating exhaust flows inside a silencer and an air flow around the silencer, respectively.

Thus, to begin with, explanation is given briefly with reference to FIG. 5A about the reason for a decrease in engine power when the voltage values of the wall surfaces of the catalytic converter 1, the exhaust pipe 2, and the silencer 3 are high, using an example case in which the voltage value of the wall surface of the silencer 3 is high. FIG. 5A shows a partial illustration of inside of the silencer 3. As shown in FIG. 5A, a plurality of partition walls A having exhaust gas circulation ports B, and a plurality of exhaust gas circulation pipes C are arranged inside the silencer 3. When the engine is driven, exhaust gas flows inside the exhaust gas circulation ports B and the exhaust gas circulation pipes C. In FIG. 5A, solid-line arrows show flows of exhaust gas when voltage of the wall surface of the silencer 3 is low. At this time, exhaust gas flows along an inner peripheral wall surface of the exhaust gas circulation port B, and flows along an inner peripheral wall surface of the exhaust gas circulation pipe C as shown by the solid-line arrows.

On the contrary, when voltage of the wall surface of the silencer 3 increases due to static electricity charge, exhaust gas flowing along the inner peripheral wall surface of the exhaust gas circulation port B is separated from the inner peripheral wall surface of the exhaust gas circulation port B due to electrical repulsive force as shown by broken-line arrows in FIG. 5A. This is because, exhaust gas tends to be positively charged. As a result, exhaust gas has to flow away from the inner peripheral wall surface of the exhaust gas circulation port B. When voltage of the wall surface of the silencer 3 increases due to static electricity charge, exhaust gas flowing along the inner peripheral wall surface of the exhaust gas circulation pipe C is separated from the inner peripheral wall surface of the exhaust gas circulation pipe C by the electrical repulsive force as shown by the broken-line arrows in FIG. 5A. As a result, exhaust gas has to flow away from the inner peripheral wall surface of the exhaust gas circulation pipe C.

When exhaust gas flows away from the inner peripheral wall surface of the exhaust gas circulation port B and the inner peripheral wall surface of the exhaust gas circulation pipe C, a section of a flow passage for exhaust gas is reduced, and, as a result, and exhaust resistance is increased. As a result, exhaust pressure is increased and engine power is decreased. Similarly, when voltage of the wall surface is increased, exhaust resistance also increases in the catalytic converter 1 and the exhaust pipe 2. Therefore, in this case, by reducing voltage of the wall surfaces of the catalytic converter 1, the exhaust pipe 2, and the silencer 3, the section of the flow passage for exhaust gas is increased as indicated by the solid-line arrows shown in FIG. 5A, thereby increasing engine power.

Figure 5B:
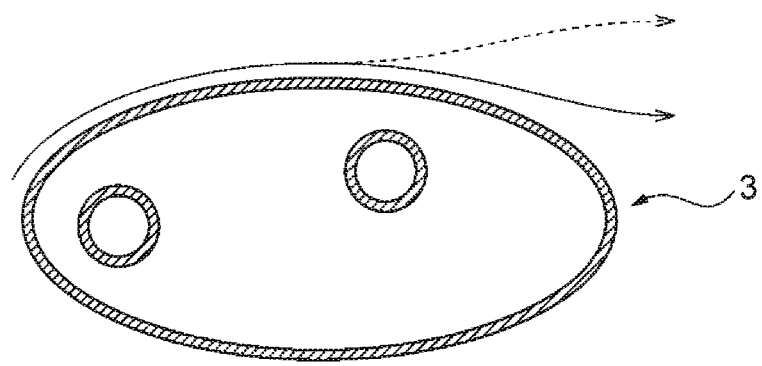

Next, explanation is given briefly with reference to FIG. 5B regarding the reason why driving of a vehicle is destabilized when voltage values of the wall surfaces of the catalytic converter 1, the exhaust pipe 2, and the silencer 3 is high, by using an example case where the voltage value of the wall surface of the silencer 3 is high. FIG. 5B shows an illustration of a section of the silencer 3. A solid-line arrow in FIG. 5B shows a flow of air when voltage of the wall surface of the silencer 3 is low. In this case, as shown by the solid-line arrow, air flows along an outer peripheral wall surface of the silencer 3. When air flows along the outer peripheral wall surface of the silencer 3 as stated above, pressure on the outer peripheral wall surface of the silencer 3 is reduced, and force that attracts the silencer 3 to a pressure-reduced side acts on the silencer 3. This force acts on the vehicle via the silencer 3.

Meanwhile, when voltage of the wall surface of the silencer 3 becomes high due to static electricity charge, an air flow is separated from the outer peripheral wall surface of the silencer 3 by electrical repulsive force as shown by the broken-line arrow in FIG. 5B. When an air flow is separated from the outer peripheral wall surface of the silencer 3, an air flow direction becomes unstable. Therefore, an amount of decrease in pressure on the outer peripheral wall surface of the silencer 3 fluctuates, and the force attracting the silencer 3 to the pressure-decreased side thus fluctuates. As a result, force acting on the vehicle via the silencer 3 fluctuates, thereby destabilizing driving of the vehicle. Similarly, in the catalytic converter 1 and the exhaust pipe 2, when voltage of the wall surfaces becomes high, air is separated from outer wall surfaces of the catalytic converter 1 and the exhaust pipe 2. Therefore, in this case, when voltage of the wall surfaces of the catalytic converter 1, the exhaust pipe 2, and the silencer 3 is decreased, air flows are stabilized as shown by the solid-line arrows in FIG. 5A, and driving stability of the vehicle is thus improved.

As described above, when voltage of the wall surfaces of the catalytic converter 1, the exhaust pipe 2, and the silencer 3, as the exhaust components, is decreased, engine power is increased. At the same time, driving stability of a vehicle is also improved. Then, when electrification charge on the support members for the exhaust components is reduced, in other words, when static electricity elimination for the rubber pieces 5 is performed, voltage of the wall surfaces of the catalytic converter 1, the exhaust pipe 2, and the silencer 3 is decreased.

When static electricity elimination is performed for the rubber pieces 5, voltage of the wall surfaces of the rubber pieces 5 is decreased. When voltage of the wall surfaces of the rubber pieces 5 is decreased, voltage of the catalytic converter 1, the exhaust pipe 2, and the silencer 3, as the exhaust components, which are supported via the rubber pieces 5, is decreased. Therefore, when static electricity elimination is performed for the rubber pieces 5, voltage of the wall surfaces of the catalytic converter 1, the exhaust pipe 2, and the silencer 3 is decreased. Thus, engine power is increased, and driving stability of a vehicle is also improved.

Figure 7A:
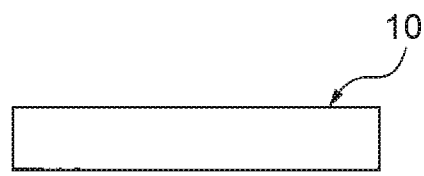
FIG. 7A, FIG. 7B, and FIG. 7C are views showing a self discharge type static electricity eliminator.
Figure 7B:
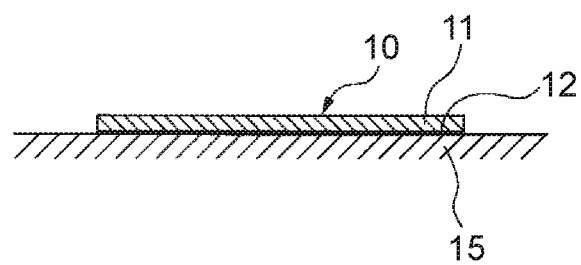
Figure 7C:
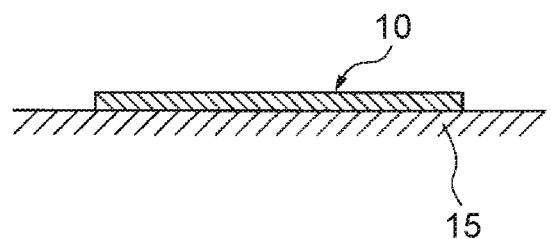

By using a self discharge type static electricity eliminator, static electricity elimination is easily performed for the rubber pieces 5 as the supporting members for the exhaust components. Examples of the self discharge type static electricity eliminator are shown in FIG. 7A to FIG. 7C. FIG. 7A and FIG. 7B show a plan view and a side sectional view of a typical self discharge type static electricity eliminator 10, respectively. FIG. 7C shows a side sectional view of another self discharge type static electricity eliminator 10.

In the example shown in FIG. 7A and FIG. 7B, the self discharge type static electricity eliminator 10 has a long and narrow rectangular flat shape, and metallic foil 11 is used as the self discharge type static electricity eliminator 10. The metallic foil 11 is adhered by a conductive adhesive 12 onto a non-conductive wall surface of a non-conductive member 15 for which static electricity elimination needs to be performed. In the example shown in FIG. 7C, a conductive thin film is used as the self discharge type static electricity eliminator 10. The conductive thin film is formed integrally on the non-conductive wall surface of the non-conductive member 15 for which the static electricity elimination needs to be performed. In the invention, static electricity elimination is performed by using the self discharge type static electricity eliminator 10 for the support members (the rubber pieces 5) for the exhaust components. Before giving explanation about a static electricity elimination method for the exhaust components, a basic static electricity elimination method using the self discharge type static electricity eliminator 10 according to the invention is explained first using an example case where static electricity elimination of the non-conductive wall surface of the non-conductive member 15 (herein after, simply referred to as a wall surface of the non-conductive member 15) is performed by the self discharge type static electricity eliminator 10.

Figure 8A:
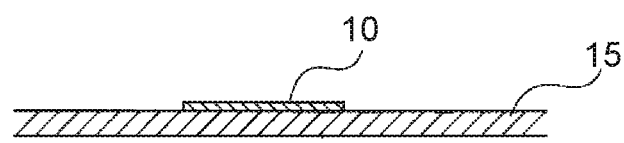
FIG. 8A and FIG. 8B are views for illustrating a static electricity elimination function by the self discharge type static electricity eliminator.
Figure 8B:
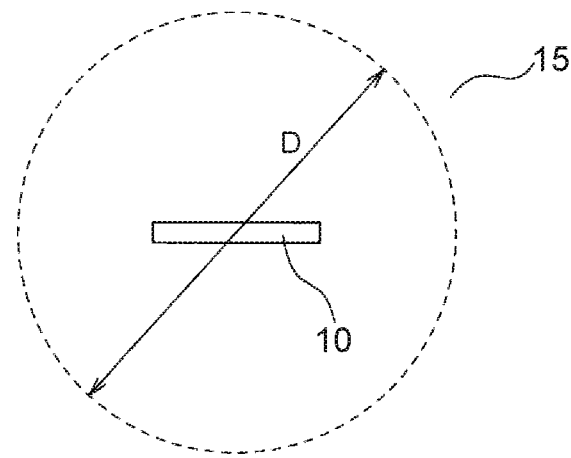

FIG. 8A shows a case where the self discharge type static electricity eliminator 10 shown in FIG. 7A and FIG. 7B is installed on the wall surface of the non-conductive member 15. When the self discharge type static electricity eliminator 10 is installed on the wall surface of the non-conductive member 15, an amount of electrification charge of the wall surface of the non-conductive member 15 is reduced within a limited area (shown by a broken line) around a location where the self discharge type static electricity eliminator 10 is installed as shown in FIG. 8B. As a result, it is confirmed that voltage of the wall surface of the non-conductive member 15 within the limited area shown by the broken line in FIG. 8B is decreased.

Figure 9A:
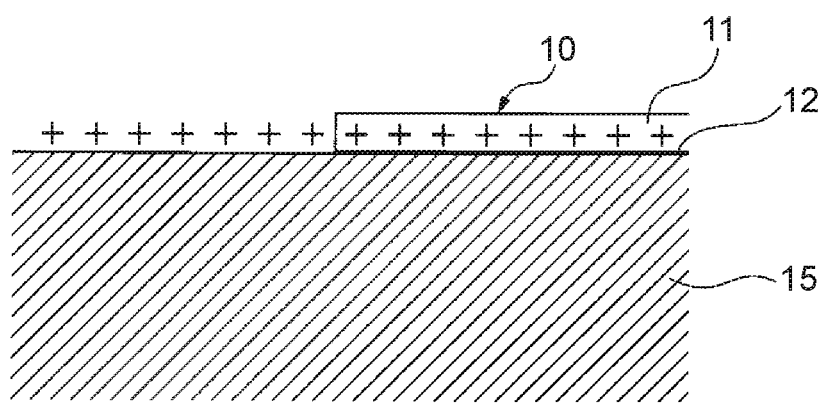
FIGS. 9A and 9B are views for explaining a self discharge function.
Figure 9B:
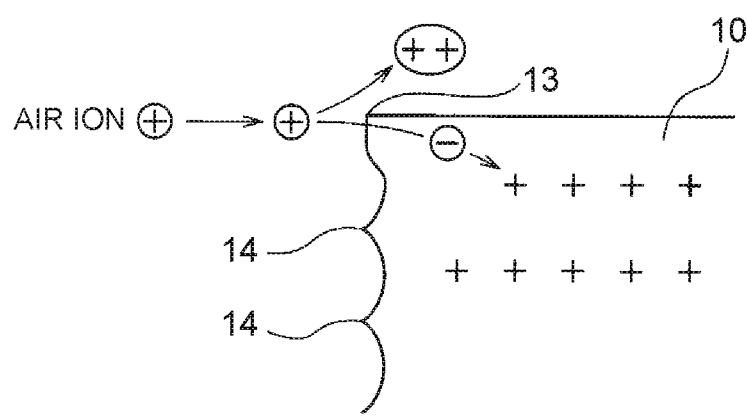

In this case, although it is not clear about static electricity elimination mechanism when static electricity elimination of the wall surface of the non-conductive member 15 is performed by the self discharge type static electricity eliminator 10, it is presumed that a static electricity elimination function on the wall surface of the non-conductive member 15 around the location where the self discharge type static electricity eliminator 10 is installed is achieved by a function of discharging positive charge by the self discharge type static electricity eliminator 10. Next, the static electricity elimination mechanism, which is presumed to be carried out on the wall surface of the non-conductive member 15, is explained with reference to FIG. 9A showing an enlarged sectional view of the self discharge type static electricity eliminator 10 shown in FIG. 8A, and FIG. 9B showing an enlarged view of an end part of the self discharge type static electricity eliminator 10 shown in FIG. 9A.

When the non-conductive member 15 is charged, inside of the non-conductive member 15 is not charged, but the wall surface of the non-conductive member 15 is charged. Meanwhile, the rubber pieces 5 shown in FIG. 1 are formed from a non-conductive rubber material. Therefore, the rubber pieces 5 shown in FIG. 1 are the non-conductive members. Hence, when the rubber pieces 5 are charged, the wall surfaces of the rubber pieces 5 are charged. As described above, it is confirmed that the catalytic converter 1, the exhaust pipe 2, and the silencer 3, as the exhaust components shown in FIG. 1, are positively charged, and it is also confirmed that the wall surfaces of the rubber pieces 5 are positively charged.

In an embodiment of the invention, in order to perform static electricity elimination for the catalytic converter 1, the exhaust pipe 2, and the silencer 3, as the exhaust components, static electricity elimination of the wall surfaces of the rubber pieces 5 is performed. FIG. 9A shows a case where the wall surface of the non-conductive member 15 is positively charged, by assuming a case where static electricity elimination of the wall surface of the rubber piece 5 is performed. Meanwhile, as described above, the self discharge type static electricity eliminator 10 is the metallic foil 11 that is adhered by the conductive adhesive 12 onto the wall surface of the non-conductive member 15. Both the metallic foil 11 and the conductive adhesive 12 are conductive. Therefore, inside of the metallic foil 11, which means inside of the self discharge type static electricity eliminator 10, is positively charged.

Voltage of the self discharge type static electricity eliminator 10 is about the same as voltage of the wall surface of the non-conductive member 15 around the self discharge type static electricity eliminator 10. This means that voltage of the self discharge type static electricity eliminator 10 is considerably high. Meanwhile, because air tends to be positively charged as described above, positive air ions (indicated with + in a circle) are present in a part of air. In this case, in comparison between electrical potential of the air ion, and electrical potential of the self discharge type static electricity eliminator 10, the electrical potential of the self discharge type static electricity eliminator 10 is much higher than the electrical potential of the air ion. Therefore, when the air ion comes close to, for example, a corner part 13 of the self discharge type static electricity eliminator 10 as shown in FIG. 9B, a field intensity becomes high between the air ion and the corner part 13 of the self discharge type static electricity eliminator 10. As a result, discharge occurs between the air ion and the corner part 13 of the self discharge type static electricity eliminator 10.

Once discharge occurs between the air ion and the corner part 13 of the self discharge type static electricity eliminator 10, some electrons of the air ions move into the self discharge type static electricity eliminator 10 as shown in FIG. 9B. Therefore, a positive charge amount of the air ion is increased (indicated with ++ in a circle), and an electron that has moved into the self discharge type static electricity eliminator 10 neutralizes positive charge on the self discharge type static electricity eliminator 10. Once discharge occurs, subsequent discharge occurs easily, and, when another air ion comes close to the corner part 13 of the self discharge type static electricity eliminator 10, discharge occurs immediately between the air ion and the corner part 13 of the self discharge type static electricity eliminator 10. In other words, when air moves around the self discharge type static electricity eliminator 10, air ions move close to the corner part 13 of the self discharge type static electricity eliminator 10 one after another. Therefore, discharge occurs continuously between air ions and the corner part 13 of the self discharge type static electricity eliminator 10.

Once discharge occurs continuously between air ions and the corner part 13 of the self discharge type static electricity eliminator 10, positive charge on the self discharge type static electricity eliminator 10 is neutralized in succession. As a result, a positive charge amount on the self discharge type static electricity eliminator 10 is reduced. When the positive charge amount on the self discharge type static electricity eliminator 10 is reduced, positive charge on the wall surface of the non-conductive member 15 around the self discharge type static electricity eliminator 10 moves into the self discharge type static electricity eliminator 10. Therefore, a positive charge amount on the wall surface of the non-conductive member 15 around the self discharge type static electricity eliminator 10 is also reduced. As a result, voltage on the self discharge type static electricity eliminator 10 and the wall surface of the non-conductive member 15 around the self discharge type static electricity eliminator 10 is decreased gradually. This function of decreasing voltage on the self discharge type static electricity eliminator 10 and the wall surface of the non-conductive member 15 around the self discharge type static electricity eliminator 10 continues until voltage on the self discharge type static electricity eliminator 10 is reduced and the discharge effect is stopped. As a result, as shown in FIG. 8B, voltage on the wall surface of the non-conductive member 15 is decreased within the limited area shown by the broken line about the location where the self discharge type static electricity eliminator 10 is installed.

Meanwhile, as described above, once discharge occurs between an air ion and the corner part 13 of the self discharge type static electricity eliminator 10, an air ion with an increased positive charge amount (indicated with ++ in a circle) is generated as shown in FIG. 9B, and the air ion with the increased positive charge amount is dispersed into circumambient air. The amount of air ions with the increased positive charge amount is extremely smaller than the amount of air flowing around the self discharge type static electricity eliminator 10. When air around the self discharge type static electricity eliminator 10 is stagnant and air ions do not move, discharge does not occur continuously, and voltage on the surface of the non-conductive member 15 is not decreased. This means that it is necessary to make air around the self discharge type static electricity eliminator 10 flow in order to decrease voltage on the surface of the non-conductive member 15.

Discharge between an air ion and the self discharge type static electricity eliminator 10 occurs between the air ion and the corner part 13 of the self discharge type static electricity eliminator 10, or between the air ion and sharp end parts 14 in a peripheral part of the self discharge type static electricity eliminator 10. Therefore, in order to make discharge happen easily between an air ion and the self discharge type static electricity eliminator 10, it is preferred that a number of sharp end parts 14 are formed, in addition to the corner part 13, in the peripheral part of the self discharge type static electricity eliminator 10. Hence, when large metallic foil is cut to manufacture the self discharge type static electricity eliminator 10, it is preferred that the metallic foil is cut such that burrs like the sharp end parts 14 are formed in the section.

The metallic foil 11 of the self discharge type static electricity eliminator 10 shown in FIG. 7A and FIG. 7B is made from ductile metal such as aluminum or copper. In the embodiment according to the invention, the metallic foil 11 is aluminum foil. Further, a longitudinal length of the aluminum foil used in the embodiment according to the invention is between about 50 mm and 100 mm, and a thickness is between about 0.05 mm and 0.2 mm. In this case, a diameter D of the limited area shown by the broken line in FIG. 8B, in which voltage is reduced, is between about 150 mm and 200 mm. An aluminum tape, in which a layer of the conductive adhesive 12 is formed on the aluminum foil, may be cut and used as the self discharge type static electricity eliminator 10. Further, as shown in FIG. 7C, a conductive thin film that is formed integrally on the surface of the non-conductive member 15 may be used as the self discharge type static electricity eliminator 10. In this case, it is also preferred that a number of sharp end parts 14 are formed, in addition to the corner part 13 shown in FIG. 9B, in a peripheral part of the conductive thin film.

In the embodiment according to the invention, the self discharge type static electricity eliminator 10 is installed on the outer periphery surface of the rubber piece 5 as shown in FIG. 2 and FIG. 4A. When the self discharge type static electricity eliminator 10 is installed on the outer periphery surface of the rubber piece 5 as described above, electrification charge within a certain area around the self discharge type static electricity eliminator 10 is eliminated by a static electricity elimination function achieved by the self discharge type static electricity eliminators 10. Thus, static electricity elimination is performed for the entire outer peripheral wall surface of the rubber piece 5. As a result, voltage of the entire outer peripheral wall surface of the rubber piece 5 is decreased. When voltage of the entire outer peripheral wall surface of the rubber piece 5 is decreased, voltage of the catalytic converter 1, the exhaust pipe 2, and the silencer 3, as the exhaust components supported via the rubber pieces 5, is decreased. As a result, engine power is increased, and, at the same time, driving stability of a vehicle is also improved.

As described so far, according to the invention, static electricity elimination is performed for the catalytic converter 1, the exhaust pipe 2, and the silencer 3, as the exhaust components, by installing the self discharge type static electricity eliminators 10 on the rubber pieces 5 as the support members for the exhaust components, thereby decreasing voltage of the wall surfaces of the catalytic converter 1, the exhaust pipe 2, and the silencer 3. In other words, the invention provides a vehicle engine exhaust system in which an exhaust component is supported by a vehicle body via a non-conductive support members, and the vehicle body and the exhaust component is positively charged. The vehicle engine exhaust system includes a self discharge type static electricity eliminator that reduces, in a state where the self discharge type static electricity eliminator is installed on a non-conductive wall surface, an amount of electrification charge on the non-conductive wall surface within a limited area around a location where the self discharge type static electricity eliminator is installed. In the vehicle engine exhaust system, the self discharge type static electricity eliminator is installed on the non-conductive support member, which enables static electricity elimination of the exhaust components.

In the embodiment shown in FIG. 1, the catalytic converter 1 and the exhaust pipe 2 are connected to each other via a connection part 1a, and the exhaust pipe 2 and the silencer 3 are connected to each other via the connection part 2a. However, when connection parts 1a, 2a are interposed as mentioned above, electric connection between the catalytic converter 1 and the exhaust pipe 2, and between the exhaust pipe 2 and the silencer 3 becomes weak, and a change in voltage on the wall surface of, for example, the silencer 3 may not affect voltage of the neighboring exhaust pipe 2. In order to decrease voltage of the wall surfaces of the catalytic converter 1, the exhaust pipe 2, and the silencer 3 in this case as well, in the embodiment shown in FIG. 1, the catalytic converter 1, the exhaust pipe 2, and the silencer 3 are supported by the vehicle body via the corresponding rubber pieces 5, and the self discharge type static electricity eliminators 10 are installed on the outer peripheral wall surfaces of the rubber pieces 5, respectively.

What is claimed is:

1. A vehicle engine exhaust system comprising:
   an exhaust component;
   a non-conductive support member, the exhaust component being supported by a vehicle body via the non-conductive support member, the vehicle body and the exhaust component being positively charged; and
   a self discharge type static electricity eliminator that reduces, in a state where the self discharge type static electricity eliminator is installed on a non-conductive wall surface, an amount of electrification charge on the non-conductive wall surface within a limited area around a location where the self discharge type static electricity eliminator is installed, the self discharge type static electricity eliminator being installed on the non-conductive support member such that static electricity elimination is performed for the exhaust component,
   wherein,
   the self discharge type static electricity eliminator is laid on the non-conductive wall surface in a form of a conductive metallic foil so that a length of the foil or the film in a direction parallel to the non-conductive wall surface is substantially larger than a thickness of the foil or the film in a direction perpendicular to the non-conductive wall surface,
   wherein the self discharge type state electricity eliminator includes a corner part and a plurality of sharp end parts formed adjacent the corner part in a peripheral portion of the self discharge type state electricity eliminator by cutting the conductive metallic foil, and
   wherein a longitudinal length of the self discharge type static electricity eliminator is between 50 mm and 100 mm, and a thickness of the self discharge type static electricity eliminator is between 0.05 mm and 0.2 mm.

2. The vehicle engine exhaust system according to claim 1, wherein the non-conductive support member is formed from a rubber material.

3. The vehicle engine exhaust system according to claim 2, wherein:
   the non-conductive support member is a rubber piece;

an upper part of the rubber piece is supported by the vehicle body, and a lower part of the rubber piece supports the exhaust component; and the self discharge type static electricity eliminator is installed on a wall surface of the non-conductive support member.

4. The vehicle engine exhaust system according to claim 3, wherein:

the rubber piece includes a pair of through holes extending in parallel to each other at an interval; and a first supporting rod supported by the vehicle body is inserted in one of the pair of the through holes, and a second supporting rod fixed to the exhaust component is inserted in the other of the pair of the through holes.

5. The vehicle engine exhaust system according to claim 1, wherein the exhaust component includes at least one of a silencer, a catalytic converter, and an exhaust pipe.

6. The vehicle engine exhaust system according to claim 1, wherein the self discharge type static electricity eliminator is metallic foil that is adhered onto a wall surface of the non-conductive support member by a conductive adhesive.

7. The vehicle engine exhaust system according to claim 6, wherein the self discharge type static electricity eliminator has a corner part for causing self discharge.

8. The vehicle engine exhaust system according to claim 6, wherein the self discharge type static electricity eliminator has a long and narrow rectangular flat shape.

9. The vehicle engine exhaust system according to claim 1, wherein the self discharge type static electricity eliminator is a conductive thin film that is formed integrally on a wall surface of the non-conductive support member.

10. The vehicle engine exhaust system according to claim 1, wherein a length of the self discharge type static electricity eliminator is 250-2000 times greater than a thickness of the foil or the film in a direction perpendicular to the non-conductive wall surface.

* * * * *